CONTROL CIRCUIT FOR LOW NOISE CONTROLLED RECTIFIER SYSTEMS

Filed Dec. 6, 1966 Sheet 1 of 2

INVENTOR
Joseph J. Codichini
BY
Mortenson and Weigel
ATTORNEYS

INVENTOR
Joseph J. Codichini
BY
Mortenson and Weigel
ATTORNEYS

United States Patent Office 3,444,456
Patented May 13, 1969

3,444,456
CONTROL CIRCUIT FOR LOW NOISE CONTROLLED RECTIFIER SYSTEMS

Joseph J. Codichini, Kennett Square, Pa., assignor to Hewlett-Packard Company, Palo Alto, Calif., a corporation of California Filed Dec. 6, 1966, Ser. No. 599,540
Int. Cl. G05f *1/46*
U.S. Cl. 323—22 12 Claims

ABSTRACT OF THE DISCLOSURE

A time proportioning temperature controller uses a pulse signal whose pulse width is modulated in accordance with deviations of a process variable from a preselected physical condition to control the electrical power supplied to a load. The power supplied to the load is varied by a silicon controlled rectifier (SCR) which is switched at the zero-crossover time of the alternating current supply voltage. The zero-crossover times are sensed using a full wave rectifier to provide a pulse which is then differentiated. The differentiated pulse corresponding to the trailing edge of the zero-crossover pulse is used to gate the SCR. The passage of this gating pulse to the SCR is controlled by the pulse width modulated signal.

Figure 1:
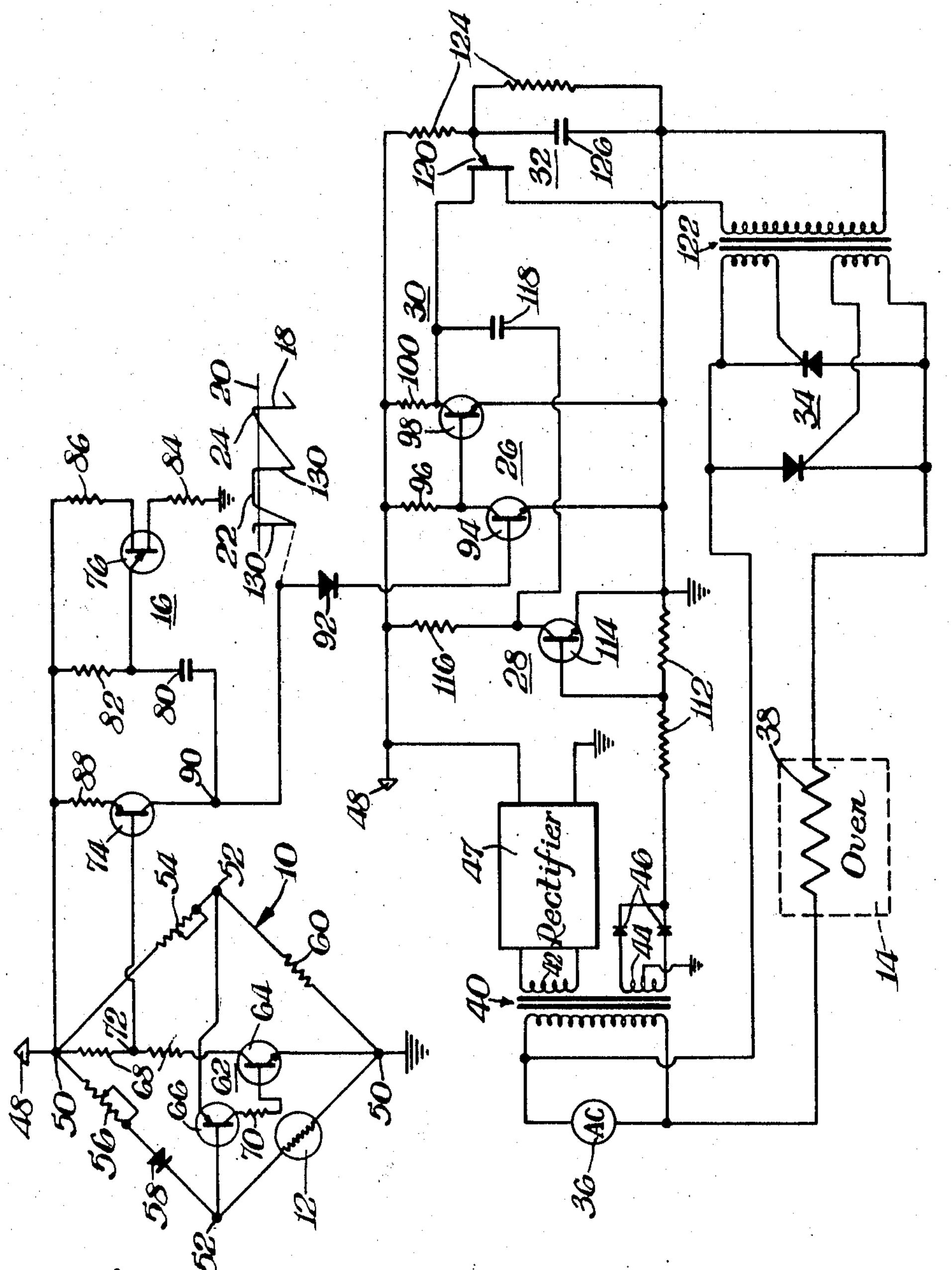

This invention relates to a control circuit for a low noise controlled rectifier system and, more particularly, to a new and improved semi-conductor control circuit responsive to variations in physical conditions, which control circuitry, facilitates switching controlled rectifiers with lower noise than has heretofore been possible.

For many years switching elements such as thyratrons, controlled rectifiers, triacs, and the like have been employed to control the power which has passed from an alternating current (A.C.) source to a load. In many applications it is desirable that the switching of the controlled rectifier occur at or near the zero-crossing time or point of the A.C. source. By switching during the interval of zero-crossing of the signal from the alternating current power source, radio frequency interference or noise as a result of the switching is greatly reduced. This reduces the need for elaborate radio frequency line filters or shielding which is often used to eliminate the effects of this radio frequency noise. Shielding of this type is not only desirable but essential when the controlled rectifier power supply is used in conjunction with relatively sensitive electronic instrumentation such as electrometer amplifiers, for example.

It is therefore an object of this invention to obviate many of the disadvantages inherent in the prior art controlled rectifier systems.

Another object of this invention is to provide an improved low noise controlled rectifier power source which produces considerably less radio frequency interference than conventional controlled rectifier power sources without the necessity of utilizing radio frequency line filters of shielding.

An additional object of this invention is to provide an improved control circuit in which the firing of a controlled rectifier is effected immediately after the start of the conduction half cycle of the controlled rectifier so as to prevent fast rising voltages from being applied through the rectifier which normally would produce radio frequency interference or noise.

Still another object of the invention is to provide an improved control circuit for providing a sharp pulse signal of relatively short time duration with the occurrence with each zero-crossing of an alternating current signal.

Another object of this invention is to provide an improved control circuit for more effectively firing a controlled rectifier to proportionately control the power supplied through the rectifier from an alternating power source to a load.

In accordance with a preferred embodiment of this invention, a completely solid state, time-proportioning temperature controller is constructed. This circuit provided a proportional output from an alternating current power source to a load such as the electrical heater of an oven in accordance with a variable amplitude direct current electrical signal. This variable amplitude electrical signal is derived from a detection means which senses variations from a preselected physical condition and converts such variations to amplitude varying direct current (D.C.) voltage signals which are indicative of the condition variation.

An oscillation circuit means connected to the detection means is modulated by the amplitude varying D.C. signals to provide a constant repetition frequency recurring pulse signal having a pulse duration proportional to the excursions of the direct current voltage signals from a norm. A first pulse forming circuit means energized by the alternating power source provides first pulses in synchronism with the source. These pulses are differentiated by a differentiating circuit means to provide first and second opposite polarity differentiated pulses corresponding respectively to the leading and trailing edges of the first pulses. Additionally, a gate circuit means, connected to the differentiating circuit means and responsive to the variable duration pulse signals passes said opposite polarity pulses. A switching means connected to the gate circuit means and to the alternating current power source is selectively responsive only to said second opposite polarity pulses to switch current from the power source in synchronism with the power source and in accordance with the variable duration electrical pulse signal.

Figure 2:
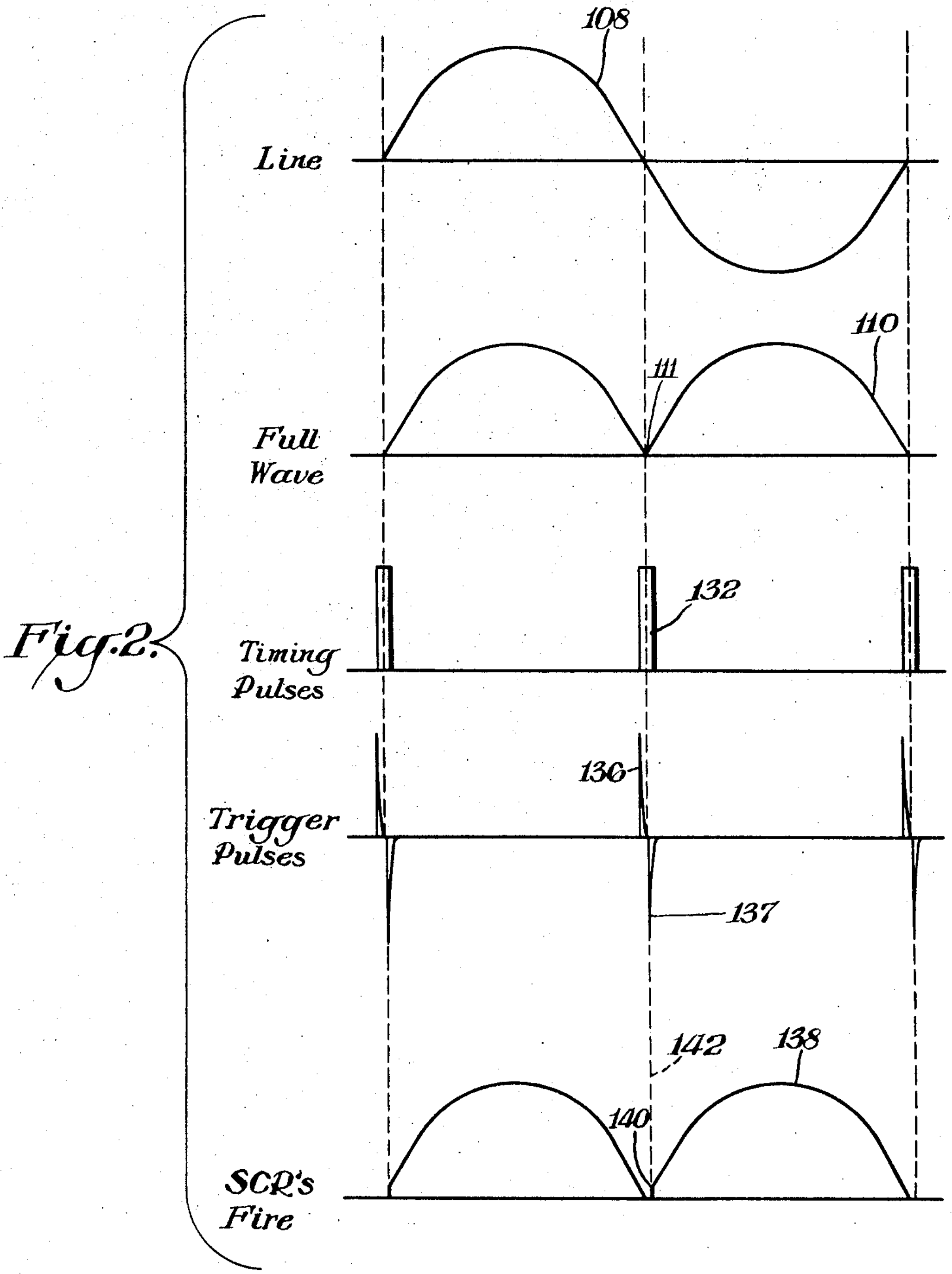

The novel features that are considered characteristic of this invention are set forth with particularity in the appended claims. The invention, itself, however, both as to its organization and method of operation, as well as additional objects and advantages thereof, will be best understood from the following description when read in connection with the accompanying drawings in which:

FIGURE 1 is a schematic circuit diagram of a solid state temperature controller constructed in accordance with a preferred embodiment in this invention; and FIGURE 2 is a graphical illustration showing several wave forms that occur at various points within the schematic circuit of FIG. 1 denoting the manner in which the firing of a controlled rectifier is controlled.

In the drawing FIG. 1 there is seen a condition sensing means, illustrated as a bridge circuit 10, whose input is a variation from a preselected physical condition such as a change in temperature from a preselected ambient; the change, of course, of a vehicle, or the like. Variations of this sort are sensed by a device such as a temperature sensitive resistor 12 or any such sensor dependent upon the nature of the condition to be monitored. The condition sensed in this instance, the temperature of an oven 14, is converted to an error signal proportional to the amount of deviation from the norm and of a polarity indicative of the direction or sense of the variation.

This deviation or error signal produced by the bridge 10 modulates or controls the "on" time of an oscillatory circuit such as a free-running multivibrator 16. The wave form of the free-running multivibrator 16 as illustrated by the wave form 18 is said to be "high" or "on" when the output voltage signal is above a reference or base line 20. These "on" times are illustrated by the varying duration peaks 22 and 24 respectively. The longer duration time of the multivibrator 16, as evidenced by the region 22, is a result of an increase in the positive going amplitude of the error signal from the bridge circuit 10 indicating, in this case, a demand for increased heat by the oven 14. This could be the result of the temperature of the oven having fallen below the set point or the set point being programmed upwardly so as to demand an increase in oven temperature. Conversely, the shorter duration "on" time of a multivibrator, as evidenced by the wave form 24, is the result of the oven having just about acquired set point temperature.

The variable duration, constant frequency signal 18 from the multivibrator 16 is passed to gate circuit 26. Gate circuit 26 is connected to control the passage of alternate or opposite polarity pulses, corresponding to the zero crossover times of the A.C. signal, from an A.C. power source 36. To provide the opposite polarity pulses for gate circuit 26, the A.C. source 36 is coupled to a synchronizing pulse forming circuit 28 which generates synchronizing pulses synchronously related to the A.C. signal. These synchronizing pulses are passed through a differentiating circuit 30 and the gate circuit 26 to a switching means 120 which controls the triggering or firing of a controlled rectifier 34 which controls the power supplied to the oven heater 38. In this manner, power supplied from the A.C. source 36 to the heating element 38 is varied in accordance with oven temperature demands as determined by the bridge 10.

Let us now consider the details of the circuitry making up the several elements just recited. The A.C. source 36 is connected through a transformer 40 having a pair of secondary windings 42 and 44, respectively. The first secondary winding 42 is connected to a conventional rectifier circuit 47 which converts the alternating current circuit signals to a D.C. voltage for use in the electronic circuitry of this invention. This D.C. voltage, available at the terminal 48, could have been supplied by a suitable battery or other D.C. source. In any event, the D.C. voltage is applied across the input terminals 50 of the bridge 10. Bridge 10 also has a pair of oppositely disposed output terminals 52 and four arms disposed between the respective input and output terminals.

A heat sensitive element 12, which may be a thermistor, platinum element, or other device makes up one arm of the bridge and is connected between one of each of the input and output terminals 50 and 52 respectively. An adjustable resistor, functioning as a span adjust potentiometer 54, forms the opposite arm of the bridge and is connected between the remaining ones of the output terminals 50 and 52. A set point potentiometer 56 and a temperature compensating diode 58 are serially connected between one of each of the remaining input and output terminals 50 and 52 to provide a third arm of the bridge 10. A fixed resistor 60 provides the fourth arm of the bridge 10.

The output from the bridge 10 is taken from the output terminals 52 and connected to be amplified by a transistor amplifier 62 of conventional design. This amplifier comprises a pair of transistors 64 and 66. The transistors 64 and 66 are of opposite conductivity types, transistor 64 being an NPN and transistor 66 being a PNP transistor. The NPN transistor 64 has its collector electrode connected through a pair of serially connected resistors 68 to the power supply voltage 48. The emitter electrode of the NPN transistor 64 is connected to a point of reference potential, or ground, at the lower (in the drawing) input terminal 50 of the bridge. The PNP transistor 66 is connected with its emitter-base circuit across the output terminals 52 of the bridge and its collector electrode connected through a resistor 70 to the input, or base, electrode of the NPN transistor 64. The output from the amplifier 62 is taken from the junction point 72 between the resistors 68 and applied to the input or base electrode of an impedance varying transistor 74 which forms a part of the free-running multivibrator circuit 16. The diode 58 compensates the base to emitter drop of the transistor 74 for the effects of temperature vagaries, while a bridge 10 is illustrated, other condition sensing circuits may be employed as desired.

Whereas any suitable circuit may be employed to provide recurring pulses of constant frequency but whose width varies as a function of the amplitude of an input signal, the one illustrated (multivibrator 16) has proven quite satisfactory. The multivibrator 16 makes use of a unijunction transistor 76 in a conventional relaxation oscillator type configuration. The impedance transistor 74, which is a PNP transistor, has its collector-emitter circuit connected in series with the timing capacitor 80 and timing resistor 82 of the multivibrator 16. The junction point between the serially connected capacitor 80 and resistor 82 is connected to the emitter of the unijunction transistor 76. The bases of the unijunction transistor 76 are respectively connected through a resistor 84 to ground and a resistor 86 to the power supply terminal 48. In like manner, a resistor 88 is connected from the power supply terminal 48 to the emitter electrode of the impedance varying transistor 74. A junction point 90 between the collector electrode of the impedance transistor 74 and the timing capacitor 80 is connected through the anode of a protective diode 92 to the base electrode of a first transistor 94 of the gate circuit 26. This first transistor 94 is an NPN transistor having its emitter electrode connected to ground and its collector electrode connected through a load resistor 96 to the power supply terminal 48. The collector electrode of the first transistor 94 is also connected to the base electrode of a second NPN transistor 98 whose collector electrode is connected through a collector resistor 100 to the power supply terminal 48 and whose emitter electrode is connected to ground.

A pair of rectifying diodes 46 are connected to either end of the secondary winding 44 and the winding is center tapped and grounded so as to rectify and provide an unfiltered full wave signal, as may be seen from the waveform 110 in FIG. 2. This unfiltered signal 110, derived originally from the line voltage denoted by the waveform 108 of FIG. 2, is passed through a voltage divider 112 which feeds the base electrode of a transistor 114. The elements 44, 46, 112, and 114 comprise the synchronizing pulse forming circuit which provide the negative-going double frequency synchronizing pulses corresponding to the zero-crossing times of the signal from A.C. source 36. The collector electrode of the transistor 114, which is an NPN transistor, is connected through a collector resistor 116 to power supply terminal 48 and through a differentiating capacitor 118 to the collector electrode of the transistor 98 which forms the gate circuit 26. The emitter electrode of transistor 114 is connected to ground.

The output of the gate circuit 26, taken from the collector electrode of transistor 98, is coupled through the base circuit of a unijunction transistor 120 and the primary winding of a pulse transformer 122 to ground. In like manner, the emitter electrode of the unijunction transistor 120 is biased by a voltage divider 124 to a point which just prevents the unijunction transistor 120 from firing at the normal output voltage level provided when the transistor 98 is cut off. A capacitor 126 bypasses a portion of the voltage divider 124 and is charged to the voltage divider level to assist in firing the controlled rectifiers 34. The secondary windings of the pulse transformer 122 are connected to the respective trigger terminals of control rectifiers 34 which here are denoted as silicon controlled rectifiers although it is to be understood that other controlled rectifiers, or the singular unit known as a triac, may be employed as well. The controlled rectifiers 34 are connected in series with the A.C. power supply 36 which supplies current to the heater element 38 in oven 14.

In operation it will be assumed that initially, either because of a change in set point potentiometer 56 or a loss of heat in the oven 14, the oven temperature drops below that called for by the set point potentiometer 56. This change in temperature unbalances the bridge 10 and provides a positive-going output signal with respect to ground at the bridge output terminals 52. With amplification by the transistor amplifier 62, there is an increase in current in the transistor amplifier 62 which produces a corresponding decrease in voltage at the output terminal 72 with respect to ground. This decreases the impedance of the impedance transistor 74. In turn, this decreased impedance of the impedance transistor 74 increases the "on" time of the multivibrator 16. In normal circumstances, the multivibrator 16 is free running at a frequency less than that of the power source, i.e., typically ten cycles per second when employed with a conventional sixty cycle power source. The frequency of the multivibrator is determined by the timing resistor and capacitors 82 and 80, respectively. The capacitor 80 charges successively through the timing resistor 82 until the firing point of the unijunction transistor 76 is reached. At this point, the unijunction transistor 76 fires causing a negative-going pulse to pass through the capacitor 80, as is denoted by the negative-going spikes 130, in the wave form 18 FIG. 1. The time required for this negative-going voltage 130 to return to its reference base level 20 is determined by the impedance transistor 74.

The lower the impedance, the more quick the return. In this instance with the decreased impedance, the multivibrator 16 very quickly returns to an "on" condition permitting a relatively long "on" period each cycle. When the multivibrator 16 is "on" the transistor 94 is biased to conduct heavily thereby driving transistor 98 to cutoff and its collector electrode to a value approaching the D.C. supply voltage 48 less the IR drop of the collector resistor 100. The gate is open. Pulses from the differentiating circuit 30 are permitted to pass to the unijunction transistor 120.

In the meantime, an unfiltered full wave D.C. voltage 110 (FIG. 2) is applied to the voltage divider 112 from the secondary winding 44 and rectifiers 46. A portion of this voltage, depending on the divider ratio, is applied to the base of the transistor 114. With the occurrence of each of the positive-going half cycle pulses 110 (FIG. 2), the transistor 114 is driven into saturation and remains in saturation at all times except when the input voltage drops to relatively low levels 111 as occurs each half cycle. These negative-going portions 111 are the synchronizing pulses which denote the zero-crossing of the input A.C. sources 36. At these zero-crossing points in time, the transistor 114 is driven to cutoff thereby generating a voltage at its collector having a wave form illustrated by the timing pulses 132 (FIG. 2) which very closely approximate a square wave. These timing pulses 132 are regularly recurring or repetitive, unipolarity pulses corresponding to the zero-crossing times.

The differentiating capacitor 118, in combination with the resistance of the collector electrodes of the transistors 114 and 98, provides at the collector electrode of the transistor 98 alternate polarity positive and negative-going pulses 136, 137 corresponding to the leading and trailing edges, respectively, of each of the timing pulses 132. It is to be noted that the negative-going spike 137 which occurs just after the line voltage from the A.C. source 36 has gone through zero, determines the point in time the controlled rectifiers 34 will fire in the line voltage cycle. One of the rectifiers 34 fires each half cycle of the line voltage from A.C. source 36 during the "on" period of the multivibrator. The "on" time of the multivibrator, or the duration of the variable time duration pulses 18, thus control the time during which the controlled rectifiers 34 can conduct.

During the "off" time of the multivibrator 16, or in the absence of an input pulse signal having an amplitude exceeding the level 20, the output of differentiator 30 is clamped by the transistor 98 to ground and the differentiated timing pulses, i.e., trigger pulses 136, 137 cannot pass to the unijunction transistor 120.

When the multivibrator is "on" the upper (in the drawing) base of the unijunction transistor 120 is at a voltage level slightly below the supply voltage 48 and capacitor 126 is charged by the voltage divider 124 to a voltage slightly less than that required to fire the unijunction 120. The negative-going trigger pulses 137, momentarily lower the potential of the upper base enabling the capacitor 126 to discharge through the unijunction transistor 120 emitter and the primary winding of pulse transformer 122. A pulse passes through the pulse transformer 122 thereby firing the controlled rectifiers 34 at the appropriate point of time 140 during the input waveform 108. This point in time occurs just after the zero-crossing times denoted by the dashed lines 142. This is done to permit a sufficient current to be present in the controlled rectifiers 34 so that once they receive a trigger pulse, conduction can be established. If on the other hand, firing the trigger pulse occurred exactly at the zero-crossing point, there would be many instances of failure of the controlled rectifier to maintain conduction for lack of holding current.

It will thus be seen that the circuit of this invention permits the temperature, for example, of the oven 14 to be controlled accurately in accordance with the adjustment of the set point potentiometer 56. Variations in the temperature of the oven with respect to the set point cause variations in the impedance of the transistor 74 which controls the "on" time of the multivibrator 16. The greater the "on" time, the greater the power supplied to the heater element 38 of the oven. It is during the "on" time of the multivibrator 16 that the gate circuit 26 permits the passage of the trigger pulses 137 from the differentiating circuit 30 which fires the unijunction transistor 120 immediately after zero crossover time each half cycle.

The circuit described is not only precise, but is relatively simple to construct and uses relatively few parts to achieve the overall synchronizing and control functions required of it.

What is claimed is:

1. A circuit for providing a proportional output from an alternating current source in accordance with a variable duration electrical signal, comprising:

synchronizing pulses forming circuit means energized by the alternating current source providing synchronizing pulses in synchronism with the zero-crossover times of said alternating current source, differentiating circuit means connected to said pulse forming circuit means for differentiating said synchronizing pulses, thereby to provide first and second opposite polarity pulses corresponding to the leading and trailing edges of each said synchronizing pulse, gate circuit means connected to said differentiating circuit means and responsive to said variable duration electrical signal for passing said second polarity pulses, switching means connected to said gate circuit means and to said alternating current source and responsive to said second polarity pulses for selectively switching current from said source in synchronism with said source and in accordance with said variable duration electrical signal, and said switching means comprising a unijunction transistor having a base circuit connected to receive said opposite polarity pulses and having an emitter electrode biased such that the interbase voltage in the absence of said second polarity pulses is greater than that necessary to fire the unijunction transistor, whereby said second polarity pulses, which occur immediately after each zero-crossing time, fire said uninjunction transistor.

2. The circuit according to claim 1 wherein said switching means also comprises:

a controlled rectifier connected to said source, said unijunction transistor base circuit being coupled to render said controlled rectifier conductive.

3. The circuit according to claim 2 wherein:

(1) said synchronizing circuit means includes:

(a) a full wave rectifier coupled to said source for providing synchronizing pulses having a recurrence frequency twice that of said source, and (b) a first transistor operatively connected to be driven from saturation to cutoff with the occurrence of each of said synchronizing pulses, thereby to shape said synchronizing pulses corresponding to each zero-crossing time of said alternating current source.

4. A circuit for providing synchronizing pulses corresponding to the zero-crossing times of a signal from an alternating current source, comprising:

synchronizing pulse forming circuit means energized by the alternating current source providing synchronizing pulses in synchronism with the zero-crossover times of said alternating current source.

differentiating circuit means connected to said pulse forming circuit means for differentiating said synchronizing pulses, thereby to provide first and second opposite polarity pulses corresponding to the leading and trailing edges of each of said synchronizing pulses, a second pulse forming circuit means responsive to said second opposite polarity pulses for providing pulses corresponding to said zero-crossing times, and a first transistor operatively connected to be driven from saturation to cutoff with the occurrence of each of said pulses corresponding to each zero-crossing time of said alternating current source.

5. A circuit for providing synchronizing pulses corresponding to the zero-crossing times of a signal from an alternating current source, comprising:

synchronizing pulse forming circuit means energized by the alternating current source providing synchronizing pulses in synchronism with the zero-crossover times of said alternating current source, differentiating circuit means connected to said pulse forming circuit means for differentiating said synchronizing pulses, thereby to provide first and second opposite polarity pulses corresponding to the leading and trailing edges of each said synchronizing pulse, and a second pulse forming circuit means responsive to said second opposite polarity pulses for providing pulses corresponding to said zero crossing times, said second circuit means including a unijunction transistor having a base circuit connected to receive said opposite polarity pulses and having an emitter electrode biased such that the interbase voltage in the absence of said second polarity pulses is greater than that necessary to fire the unijunction transistor, whereby said second polarity pulses, which occur immediately after each zero-crossing point, fire said unijunction transistor.

6. The circuit according to claim 5 wherein said second circuit also includes:

a controlled rectifier connected to said source, said unijunction transistor base circuit being coupled to render said controlled rectifier conductive.

7. The circuit according to claim 6 wherein said second circuit means includes:

a full wave rectifier coupled to said source for providing said synchronizing pulses having a recurrence frequency twice that of said source, and a first transistor operatively connected to be driven from saturation to cutoff with the occurrence of each of said pulses corresponding to each zero-crossing time of said alternating current source.

8. A circuit for providing a proportional output from an alternating current source in accordance with a variable amplitude direct current electrical signal, comprising:

detection means for sensing variations from a preselected physical condition and for converting said variations to amplitude variable direct current voltage signals indicative of said variation;

oscillation circuit means connected to said detection means for providing a constant repetition frequency electrical pulse signal having a duration proportional to excursions of said direct current voltage signals from a norm;

synchronizing pulse forming circuit means energized by the alternating current source providing synchronizing pulses in synchronism with the zero-crossover times of said alternating current source, differentiating circuit means connected to said pulse forming circuit means for differentiating said synchronizing pulses, thereby to provide first and second opposite polarity pulses corresponding to the leading and trailing edges of each said synchronizing pulse, gate circuit means connected to said differentiating circuit means and responsive to said variable duration electrical signal for passing said second polarity pulses, switching means connected to said gate circuit means and to said alternating current source and responsive to said second polarity pulses for selectively switching current from said source in synchronism with said source and in accordance with said variable duration electrical signal.

9. The circuit according to claim 8 wherein said synchronizing circuit means includes:

a full wave rectifier responsive to said power source for providing said synchronizing pulses having a recurrence frequency twice that of said source, and a first transistor operatively connected to be driven from saturation to cutoff with the occurrence of each of said synchronizing pulses thereby to generate one of said pulses corresponding to each zero-crossing time of said alternating current source.

10. The circuit according to claim 8 wherein said switching means comprises:

a unijunction transistor having a base circuit connected to receive said opposite polarity pulses and having an emitter electrode biased such that the interbase voltage in the absence of said second polarity pulses is greater than that necessary to fire the unijunction transistor, whereby said second polarity pulses, which occur immediately after each zero-crossing time, fire said unijunction transistor.

11. The circuit according to claim 10 wherein said switching means also comprises:

a controlled rectifier connected to said source, said unijunction transistor base circuit being coupled to render said controlled rectifier conductive.

12. The circuit according to claim 8 wherein:

(1) said synchronizing circuit means includes (a) a full wave rectifier responsive to said source for providing said synchronizing pulses having a recurrence frequency twice that of said source, and (b) a first transistor operatively connected to be driven from saturation to cutoff with the occurrence of each of said synchronizing pulses, thereby to generate one of said pulses corresponding to each zero-crossing time of said alternating current power source; and (2) said switching means includes (a) a unijunction transistor having a base circuit connected to receive said opposite polarity pulses and having an emitter electrode based such that the interbase firing voltage in the absence of said opposite polarity pulses is greater than that necessary to fire the unijunction transistor, whereby said second polarity pulses, which occur immediately after each zero-crossing time, fire said unijunction transistor, and (b) a controlled rectifier connected to said power source, said unijunction transistor base circuit being coupled to render said controlled rectifier conductive.

References Cited

UNITED STATES PATENTS

| | | | |
|---|---|---|---|
| 3,259,825 | 7/1966 | James. | |
| 3,265,933 | 8/1966 | Perry et al. | 307—262 X |
| 3,283,179 | 11/1966 | Carlisle et al. | 307—133 |
| 3,329,887 | 7/1967 | Schaeve. | |
| 3,354,377 | 11/1967 | Leeds. | |

JOHN F. COUCH, *Primary Examiner.*

A. D. PELLINEN, *Assistant Examiner.*

U.S. Cl. X.R.

219—494; 307—133, 269; 323—24, 38